United States Patent

Jahanghir et al.

[11] Patent Number: 5,940,072
[45] Date of Patent: Aug. 17, 1999

[54] GRAPHICS DECOMPRESSION USING SYSTEM ROM INDEXING IN TV SET TOP BOX

[75] Inventors: Musa Jahanghir, Hayward; Steve Blonstein, Palo Alto; Ikram Jahangiri, Hayward; Steve Jeck, San Francisco, all of Calif.

[73] Assignee: Samsung Information Systems America, San Jose, Calif.

[21] Appl. No.: 08/698,104

[22] Filed: Aug. 15, 1996

[51] Int. Cl.$^6$ ...................................................... H04N 7/16
[52] U.S. Cl. .......................... 345/327; 348/10; 348/384; 455/6.2
[58] Field of Search ..................... 348/10, 11, 6, 348/7, 12, 13, 384, 390, 569, 568, 563, 564; 455/6.2, 6.3, 6.1, 4.2, 5.1; 345/202, 501, 515, 516, 507; 364/715.02; H04N 7/173

[56] References Cited

U.S. PATENT DOCUMENTS

| | | |
|---|---|---|
| 5,198,901 | 3/1993 | Lynch . |
| 5,293,229 | 3/1994 | Iu . |
| 5,311,310 | 5/1994 | Jozawa et al. . |
| 5,361,105 | 11/1994 | Iu . |
| 5,386,234 | 1/1995 | Veltman . |
| 5,400,076 | 3/1995 | Iwamura . |
| 5,489,947 | 2/1996 | Cooper . |
| 5,619,250 | 4/1997 | McClellan et al. ........................ 348/10 |
| 5,666,293 | 9/1997 | Metz et al. ................................ 348/12 |

*Primary Examiner*—Chris Grant
*Attorney, Agent, or Firm*—Kenneth L. Sherman, Esq; Sherman & Sherman

[57] ABSTRACT

A graphics data decompression arrangement in a TV set top box that includes a system ROM for storing graphics data broken down into tiles, each of which is identified by a unique index number. The index numbers that identify the tiles of graphics data required to be included in a current picture on a TV set screen are written into a DRAM. An MPEG decoder reads the index numbers to convert them into a graphics address signal supplied via a ROM address bus to the system ROM to indicate the addresses of the required tiles of graphics data. In response, the required tiles are fed to the MPEG decoder for decompression in accordance with an MPEG decompression algorithm. A time-division multiplexing scheme allows the ROM address bus to be used for transmitting to the system ROM an address signal from a CPU that indicates where information required for CPU operations is located in the system ROM. In response to the CPU address signal, the required information is fed to the CPU.

20 Claims, 8 Drawing Sheets

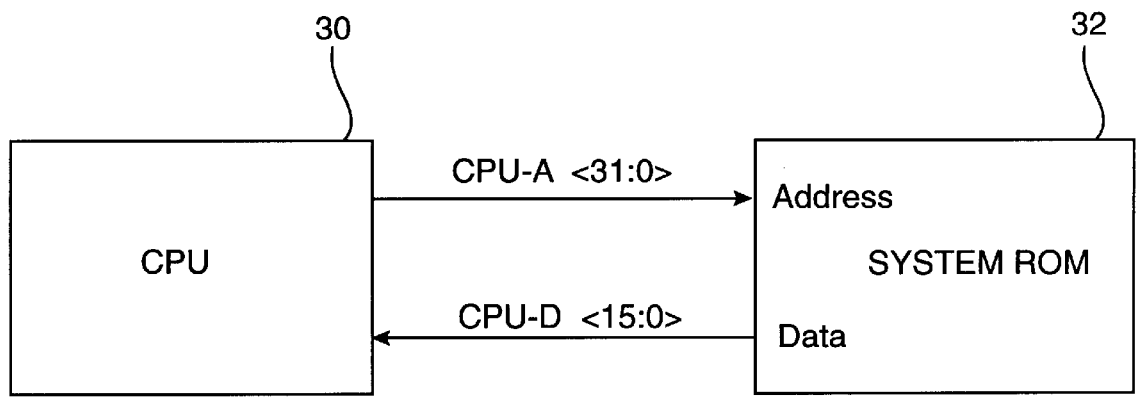
(PRIOR ART)
FIG. 4
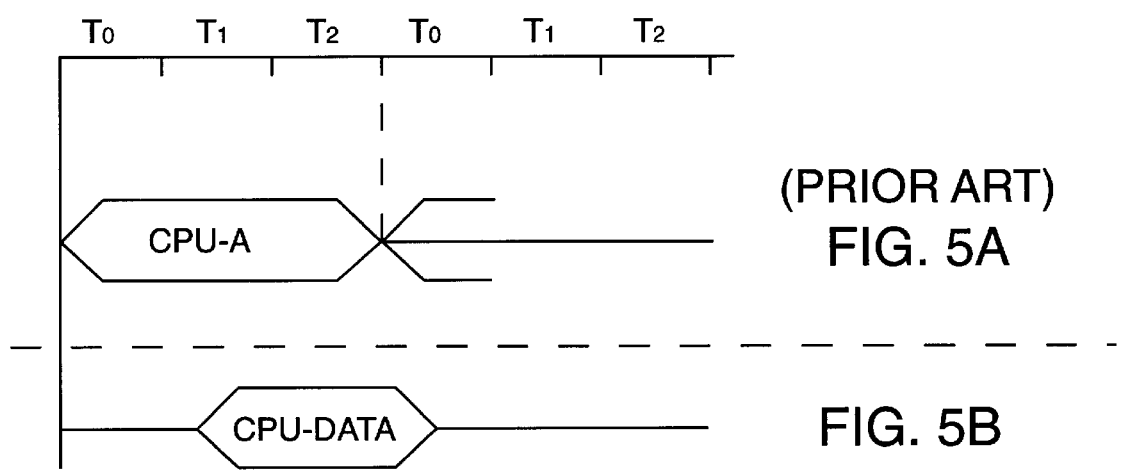
(PRIOR ART)
FIG. 5A
FIG. 5B

GRAPHICS DECOMPRESSION USING SYSTEM ROM INDEXING IN TV SET TOP BOX

TECHNICAL FIELD

The present invention relates to digital video signal processing and more particularly to a system for graphics decompression in a television set top box.

BACKGROUND ART

Data compression may be provided in data processing systems to reduce the time of data transmission in communication links, or to transmit broad-bandwidth signals via narrow-bandwidth communication channels. Also, data compression may be used to increase the quantity of data that can be stored in a given space, or to decrease the space needed to store a given quantity of data.

The compressed signals may be received over a communications link from any telecommunications source including, for example, satellite broadcast. Various conventional formats have been contemplated for compressed video signals, the standard currently favored being set forth by the Motion Picture Experts Group (MPEG). The MPEG standard defines a compression and decompression algorithm for motion-picture video services. MPEG is a bi-directional predictive coding compression standard, coded in accordance with discrete cosine transformation (DCT) processing. Picture elements are converted from spacial information into frequency domain information to be processed. Due to video compression, motion-picture images can be sent over a communication channel using only a fraction of conventional television channel. As a result, many more video channels can be carried over a given communication medium. Moreover, conventional telephone links are enabled to deliver broad-bandwidth television signals.

In the MPEG algorithm, each frame of a motion-picture video is defined either independently, or as a change from a previously displayed frame. A video scene may be described by a single independent infra-coded frame, or I-frame which shows the entire scene as it initially appears, and serves as a reference frame to derive compressed data for encoded change frames in advance of or following the I frame in the encoded frame sequence. Thus, the MPEG video compression technique eliminates the redundant transmission of unchanging elements of the scene.

The number of actual video frames to be coded into such I frames is set in the MPEG syntax, e.g., one reference frame for each fifteen frames, or every half second. Interspersed among successive I frames are frames generally of increased compression. A prediction is made of the composition of a video frame to formulate a prediction frame, termed a P frame, to be located a specific number of frames following or in advance of the next reference frame, the specific number also set in the MPEG syntax. Information from previous frames as well as later frames may be used in formulating the prediction. A P frame may be encoded from I frame information by partitioning the P frame into blocks of pixels, or motion blocks. A matching block is sought in the I frame for each motion block of the P frame. Motion vectors are used to indicate the displacement in the x and y directions between the matched blocks in the two frames. A P frame, as well as an I frame, may serve as matching block reference information for deriving another P frame.

Differences between the motion blocks and the matched blocks are also encoded. P frames are thus represented by less data, and are thus more compressed, than the encoded I frames.

"Delta" information is developed for coding frames, called B frames, between the actual (I) and predicted (P) frames, and between (P) frames also by looking at frames in both directions. Rather than updating a whole frame, only the changed (or delta) information is provided for the delta frames. Thus the total information coded, and then transmitted, is considerably less than required to supply the actual information in the total number of frames.

The MPEG algorithm is defined in the following International Organization for Standardization (ISO) specifications: ISO/IEC 11172, November 1991 (MPEG 1), and ISO/IEC WG11 N0501, July 1993 (MPEG 2).

By way of example, reference is made to U.S. Pat. No. 5,198,901 to Lynch of Mar. 30, 1993; to U.S. Pat. No. 5,293,229 to Iu of Mar. 8, 1994; to U.S. Pat. No. 5,311,310 to Jozawa et al. of May 10, 1994; to U.S. Pat. No. 5,361,105 to Iu of Nov. 1, 1994; to U.S. Pat. No. 5,386,234 to Veltman et al. of Jan. 31, 1995; and to U.S. Pat. No. 5,400,076 to Iwamura of Mar. 21, 1995. Those disclosures and citations referenced therein may be consulted for an understanding of the specific details of conventional MPEG compression and decompression arrangements.

As illustrated by the above identified patents, various schemes have been developed to carry out MPEG coding and decoding. Transmitted MPEG data generally includes I frame data, motion vector information for P frames and B frames, difference or residue data for predictive coding, and data indicative of a particular coding scheme used.

On decompression, an MPEG decoder in sequence uses the reference frames to form the prediction frames, which frames also may be used to construct the delta frames. Data is thus often decoded in an order different from the order in which frames are viewed. Decoding must be several frames ahead of the frame currently shown on video.

For example, MPEG coding and decoding may be used in a digital satellite television system that includes a transmitter for transmitting television signals to a satellite in a geosynchronous earth orbit. The satellite retransmits the received television signals to a terrestrial receiver equipped with a dish-like antenna.

Within the transmitter, analog video and audio signals are converted to respective digital signals compressed according to the MPEG encoding standard. The resultant digital signals are represented by a stream of packets including error correction data. The type of packets is identified by a header code. Packets corresponding to control data may also be added to the packet stream.

In the MPEG standard, the video information may be transmitted in the form of a luminance (Y) component and two color difference (U and V) components. For example, the first color difference component may represent the difference between the red image information and the luminance image information (R-Y), and the second color difference component may represent the difference between the blue image information and the luminance image information (B-Y). In addition, the color information is compressed because the two color difference components correspond to more than one picture element. The use of color difference components and the sharing of the color difference components between picture elements reduces the transmission bandwidth.

The digital information resulting from the compression and error correction encoding is modulated on a carrier using Quaternary Phase Shift Keying (QPSK) modulation and transmitted to a satellite for retransmission.

The terrestrial receiver comprises a tuner for selecting the appropriate carrier signal retransmitted by the satellite and for converting the frequency of the selected carrier to an intermediate frequency (IF) signal. A QPSK demodulator demodulates the IF signal and supplies it to an error-correcting decoder to correct demodulated packets representing video and audio information. An MPEG decoder decodes and decompresses video and audio packets to form digital video and audio signals supplied to a TV set.

A TV set top box serves to deliver compressed digital video and audio signals in real time usable form to one or more TV sets. FIG. 1 illustrates a block diagram of an exemplary prior art MPEG decoder 10 that may be used in the set top box. Encoded signals of blocks of a video frame are received successively at the input terminal and buffered at a buffer 11. The received signals comprise picture signal data and motion vector data, the latter data being prevalent in B frame and P frame signals. I frame data and P frame data serve as reference block data for the motion vectors contained in other B frame and P frame signals.

A portion of a display frame is illustrated in FIG. 2A, wherein a display object is positioned in a block at the lower left area. FIG. 2B illustrates a portion of a later display frame wherein the object has moved to another position in the display frame displaced in the x and y directions from the location in the frame of FIG. 2A. The original object may have changed somewhat, such as in dimension, shape color, etc., or have remained substantially unchanged. As shown, the object in the later frame occupies portions of four blocks. Video signals for the frame of FIG. 2B are coded with motion vector data indicating location displacement of blocks from the reference frame position as well as difference data that represent changes in picture content.

Blocks of video signal data from the buffer are fed successively to a demultiplexer 13, which separates motion vector information from picture signal components. The resulting picture signal is fed to a variable length decoder 15, which decodes each block to provide quantized transform coefficients. This block data is then fed successively to an inverse quantizer 17 and an inverse discrete cosine transform circuit 19 whereby block picture information is recovered.

The motion vector data for the current block is fed from the demultiplexer 13 to a motion vector calculating circuit 21. The motion vector calculating circuit receives a reference block of picture data from a frame memory 23 and provides compensation in accordance with motion vector data for the current block received from the demultiplexer. The resulting block picture data is combined with the picture information recovered from a discrete cosine transform circuit 19 at an adder 25. The reconstructed picture block thus obtained is stored as a new block in the frame memory 23. The frame memory 23 may be a dynamic random-access memory (DRAM) or synchronous DRAM storage. A frame selector circuit 27 controls arrangement of delivery of the decoded frames, all stored blocks correlated therewith, in the proper order. Reference is made to the Iwamura and Veltman et al. patents, identified previously, for further description of this prior art decoding scheme.

As shown in FIG. 3, in addition to an MPEG decoder and OSD 20, a conventional TV set top box may include a CPU 30 that controls a decoding procedure. For example, a CPU integrated circuit manufactured by Motorola may be used as the CPU 30. A system ROM 32 is coupled to the CPU 30 for storing CPU programming data, and compressed graphics data to be reproduced on a TV set screen. An on screen display (OSD) arrangement disclosed, for example, in U.S. Pat. No. 5,489,947 to Cooper of Feb. 6, 1996, incorporated herewith by reference, allows the graphics data supplied from the ROM 32 to be displayed on the screen together with the image represented by the received video signals, or in place of this image. For example, the system ROM 32 may store alphanumeric symbols and/or pictorial graphics representing status information, such as TV channel numbers or logos displayed on the TV set screen, together with video information from the corresponding TV channel. The OSD arrangement may be incorporated in the MPEG decoder 20 coupled to the CPU 30 for decoding the received compressed video and audio signals, and for decompressing the compressed graphic image data supplied from the system ROM 32. Via the MPEC decoder 20, the CPU 30 writes the compressed graphics data to the DRAM frame memory 23 that interacts with the MPEG decoder 20 to support decompression operations. Decompressed video, audio and graphics information is reproduced by a TV set 36 in accordance with a conventional TV standard such as NTSC, PAL or SECAM.

As discussed above, in addition to the graphics data, the frame memory 23 stores decoded blocks of received video information. Thus, a large amount of DRAM is needed to deliver acceptable picture resolution and quality. Such a large memory requirement makes the set top box expensive.

Therefore, it would be desirable to provide a TV set top box arrangement that would allow the DRAM storage capacity to be reduced without deteriorating picture resolution and quality. The savings of memory could be used to produce a higher quality graphics.

Further, as shown in FIG. 4, to read graphics image data, the CPU 30 supplies the ROM 32 via a 32-bit address bus CPU-A with an address signal that indicates an address of graphics data to be displayed on the TV screen. Alternatively, the address of CPU processing information required for CPU operations may be indicated. The requested data is delivered to the CPU 30 via a 16-bit data bus CPU-D. Then, the CPU 30 supplies the retrieved compressed graphics data to the MPEG decoder 10 for decompressing. The received CPU processing information supports CPU operations.

As illustrated in FIGS. 5A and 5B, in the conventional system, the address signal in the address bus CPU-A is active during all three cycles $T_0-T_2$ of a CPU processing period. The data bus CPU-D is occupied with delivering the graphics data from the ROM 32 approximately from the middle of cycle $T_1$ of one processing period until the middle of cycle $T_0$ of the next processing period. For example, for a CPU integrated circuit manufactured by Motorola, each of the cycles $T_0-T_2$ corresponds to a 16 MHz system clock cycle.

Accordingly, the CPU 30 is busy with handling the graphics data during a substantial portion of its processing period. It would be desirable to arrange the TV set top box so as to reduce the CPU involvement in the graphics data delivery, in order to allow the CPU to perform other required operations, for example, to support the MPEG decoding at higher rates.

DISCLOSURE OF THE INVENTION

Accordingly, one advantage of the invention is in providing a graphics data decompression arrangement in a TV set top box that would allow DRAM storage capacity to be reduced without deteriorating picture resolution and quality.

Another advantage of the invention is in providing a graphics data decompression arrangement in a TV set top box that would allow CPU involvement in graphics data delivery to a TV set to be reduced.

The above and other advantages of the invention are achieved, at least in part, by providing a system for decompressing graphics data that comprises a CPU, a decoder controlled by the CPU for decompressing the graphics data, and a system ROM coupled to the decoder for storing the graphics data to be decompressed. The decoder is supplied with the graphics data directly from the system ROM in response to a graphics address signal provided by the decoder to the system ROM.

In accordance with a first aspect of the invention, the system ROM stores the graphics data broken down into tiles having unique index numbers. Each of the tiles may define a mixture of compressed and non-compressed graphics data. A RAM is provided for storing the index numbers fed to the decoder for generating the graphics address signal.

In accordance with another aspect of the invention, the system ROM further stores information required for operations of the CPU, for example CPU programming information. The CPU supplies the decoder with a CPU address signal to indicate address of this information in the system ROM. The CPU address signal and the graphics address signal are transmitted to the system ROM via a ROM address bus connected between the decoder and system ROM. A time-division multiplexer is provided in the decoder for transmitting the graphics address signal and the CPU address signal in successive time intervals.

Further, the decoder may comprise a graphics address generator preprogrammed to convert the index numbers fed from the RAM into the graphics address signal to indicate ROM locations of the tiles identified by the index numbers.

A data bus may be connected between a data output of the system ROM and data inputs of the CPU and decoder for transmitting the graphics data and the CPU operation information from the system ROM in successive time intervals.

In accordance with a preferred embodiment of the invention, the decoder may comprise an MPEG decoder for performing graphics data decompression in accordance with an MPEG decompression algorithm. The arrangement that allows the MPEG decoder to receive graphics data directly from the system ROM may be implemented in a TV set top box of a digital satellite television system.

In accordance with a method of the present invention, the following steps are carried out:
  storing graphics data in a ROM,
  dividing the graphics data into data blocks identified by index numbers,
  storing the index numbers in a RAM,
  reading the index numbers from the RAM to generate an address signal for accessing the ROM,
  retrieving the graphics data from the ROM in response to said address signal, and
  decompressing the graphics data.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention.

Accordingly, the drawings and description are to be regarded as illustrative in nature, and not as restrictive.

BRIEF DESCRIPTION OF DRAWINGS

FIG. 4 is a block diagram illustrating interaction between a CPU and a system ROM in the conventional graphics data decompression arrangement.

FIGS. 5A and 5B are timing diagrams illustrating signals in system buses in the conventional graphics data decompression arrangement.

BEST MODE FOR CARRYING OUT THE INVENTION

The best mode for practicing the invention is based on the realization of a graphics decompression arrangement of a TV set top box in a digital satellite communications system; however it is to be understood that the present invention is applicable to any system for decoding compressed graphics data.

Figure 1:
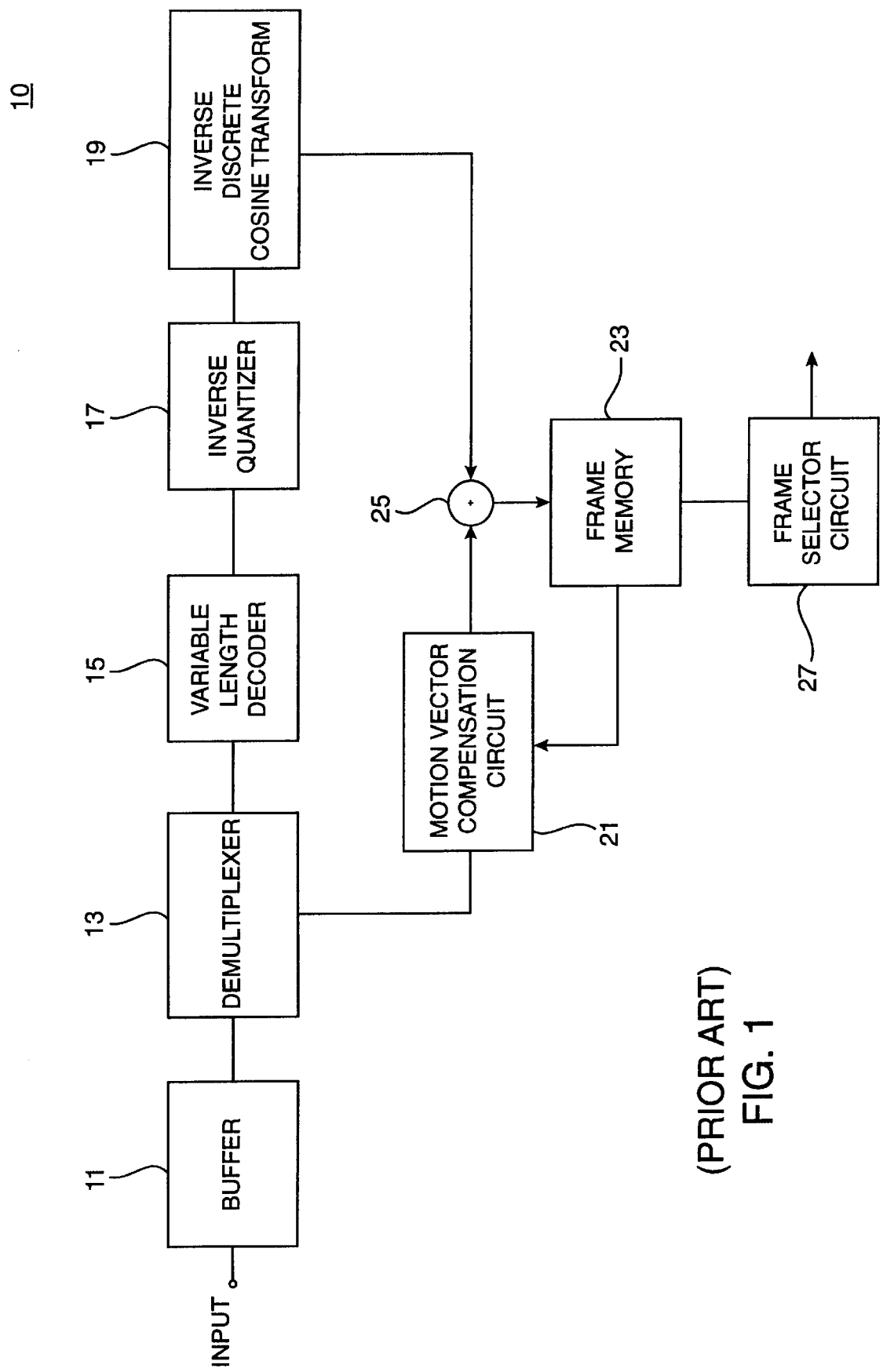
FIG. 1 is a block diagram of a conventional MPEG decoding scheme.
Figure 2B:
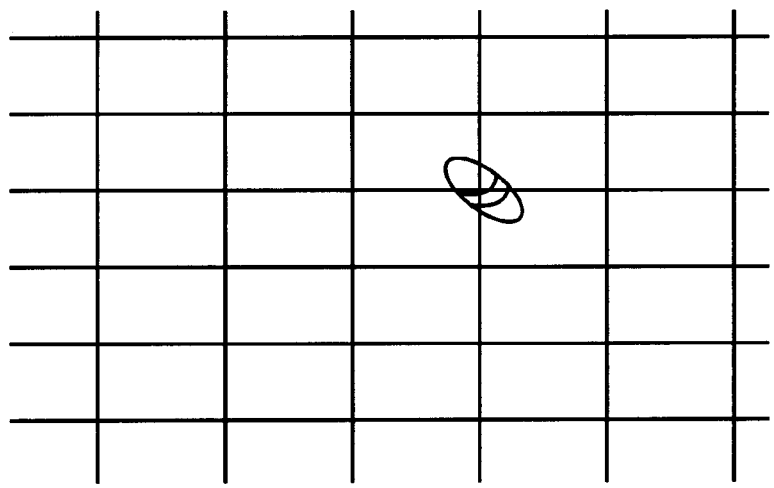
FIGS. 2A and 2B are representations of display portions, illustrating changes and displacement of a displayed object over a time interval.
Figure 2A:
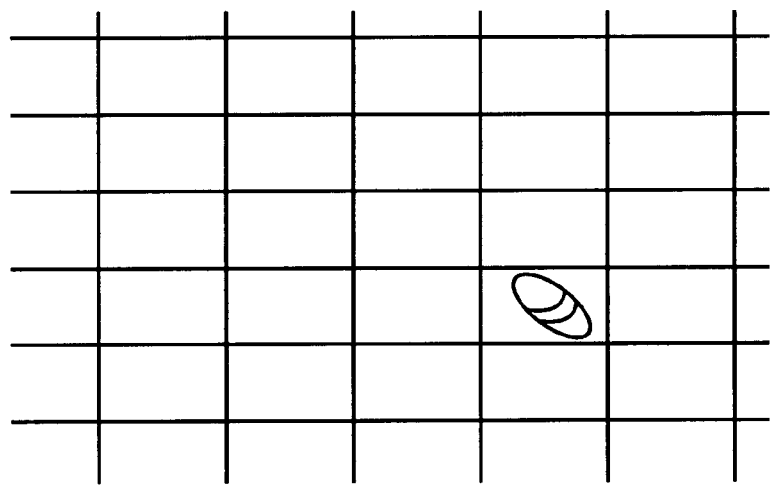
Figure 3:
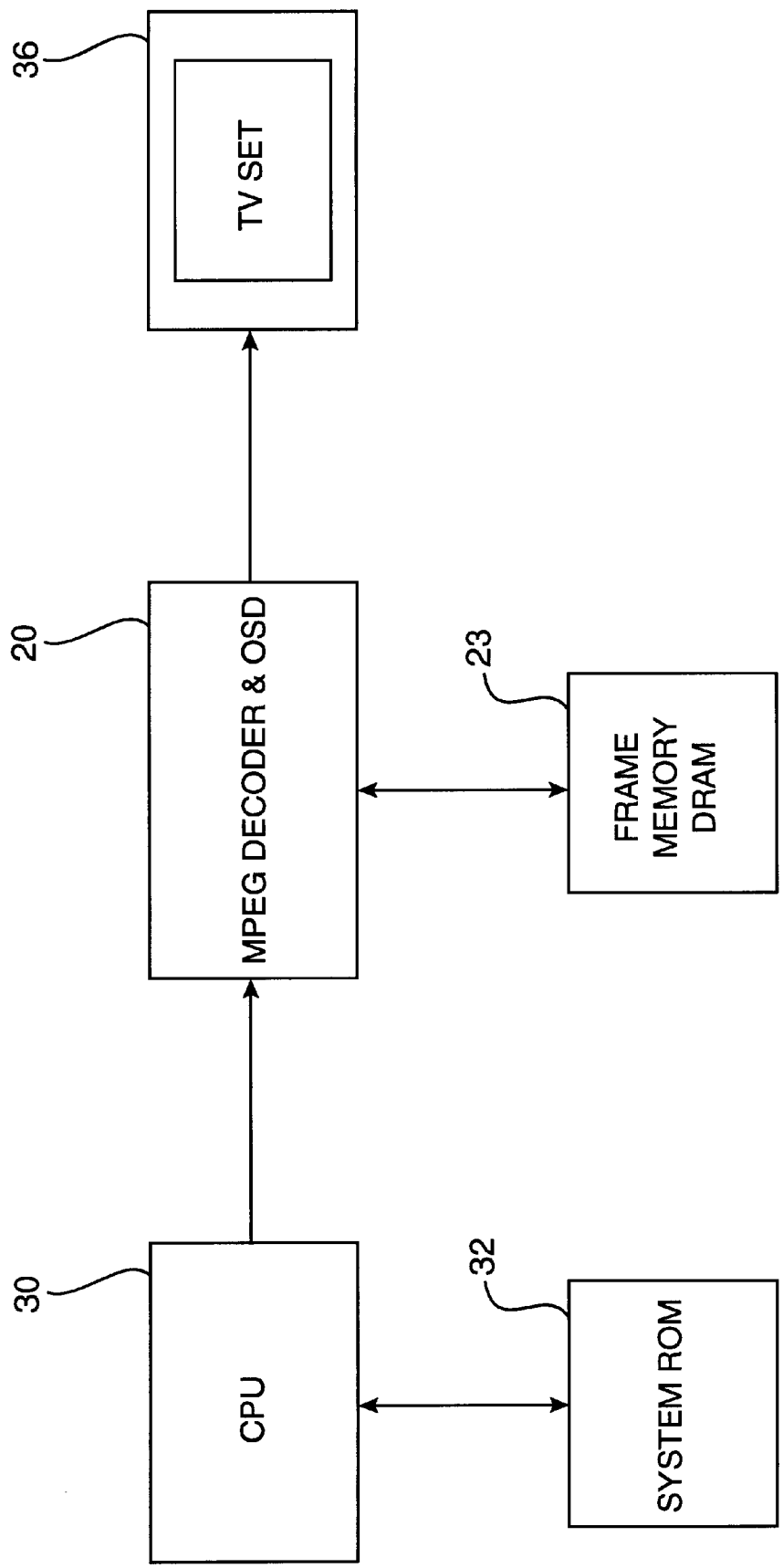
FIG. 3 is a block diagram of a conventional graphics data decompression arrangement.
Figure 6:
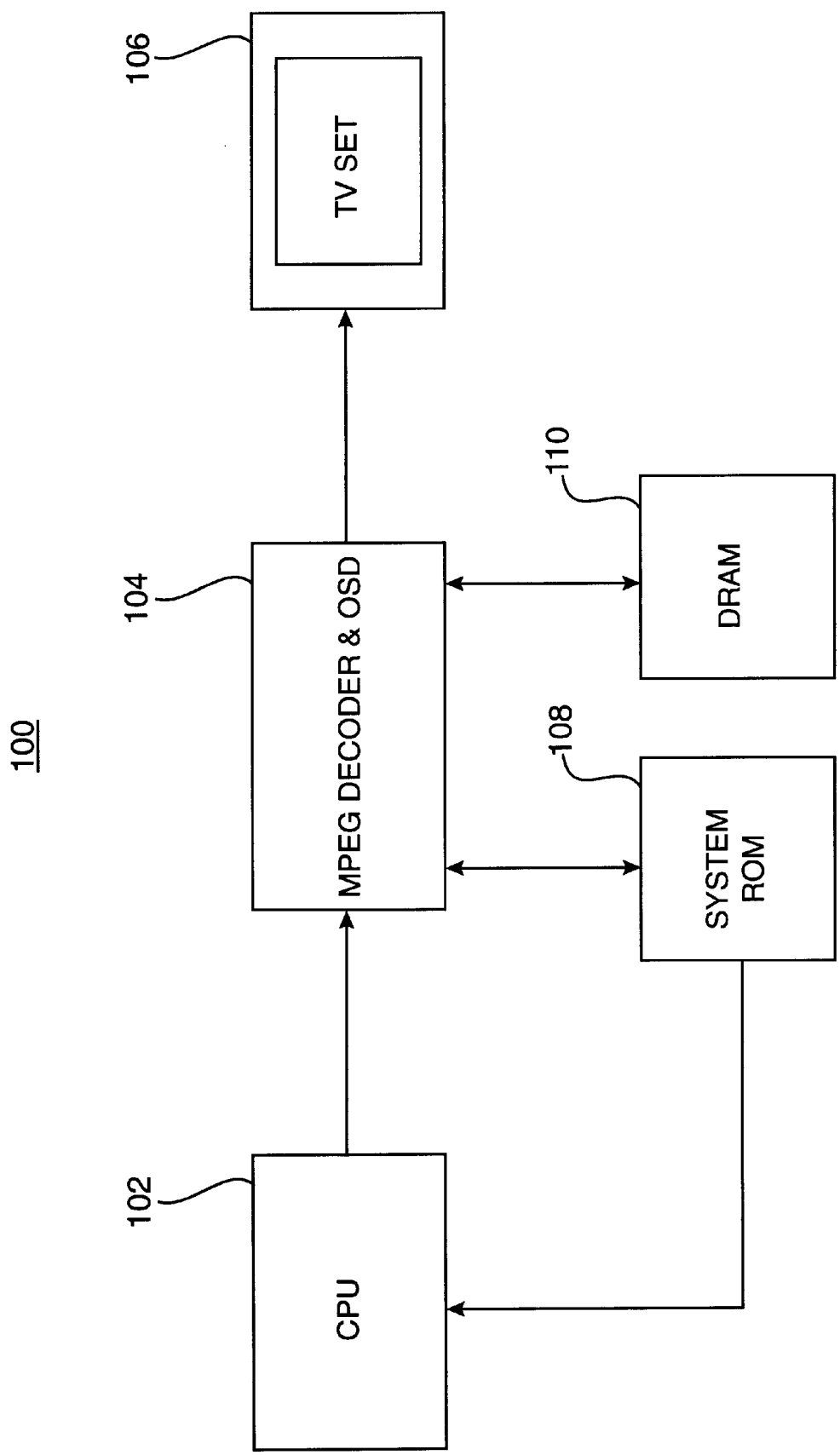
FIG. 6 is a block diagram of a graphics data decompression arrangement of the present invention.

Referring to FIG. 6, a graphics decompression arrangement 100 of the present invention comprises a CPU 102 coupled to an MPEG decoder 104 that implements the MPEG decompression algorithm to deliver compressed video, audio and graphics data to a TV set 106. The structure of the CPU 102 and MPEG decoder 104 may be basically similar to the structure of the corresponding elements shown in FIGS. 1 and 3. The MPEG decoder 104 is coupled to a system ROM 108 and DRAM 110 that support its decompression operations. As the present invention is concerned with graphics data delivery aspects of a TV set top box, circuits for decoding received video and audio signals are not shown in FIG. 6. Reference is made to the Iwamura, Veltman et al. and Cooper patents, identified previously, for description of these prior art circuits.

The system ROM 108 is arranged for storing compressed graphics data, such as pictorial graphics representing status information, for example, TV channel logos that may be displayed on a TV set screen, together with video information from the corresponding TV channel. In addition to compressed graphics data, non-compressed graphics data may also be stored. Further, the system ROM 108 stores non-compressed information required for CPU operations, for example, CPU programming information.

Figure 7:
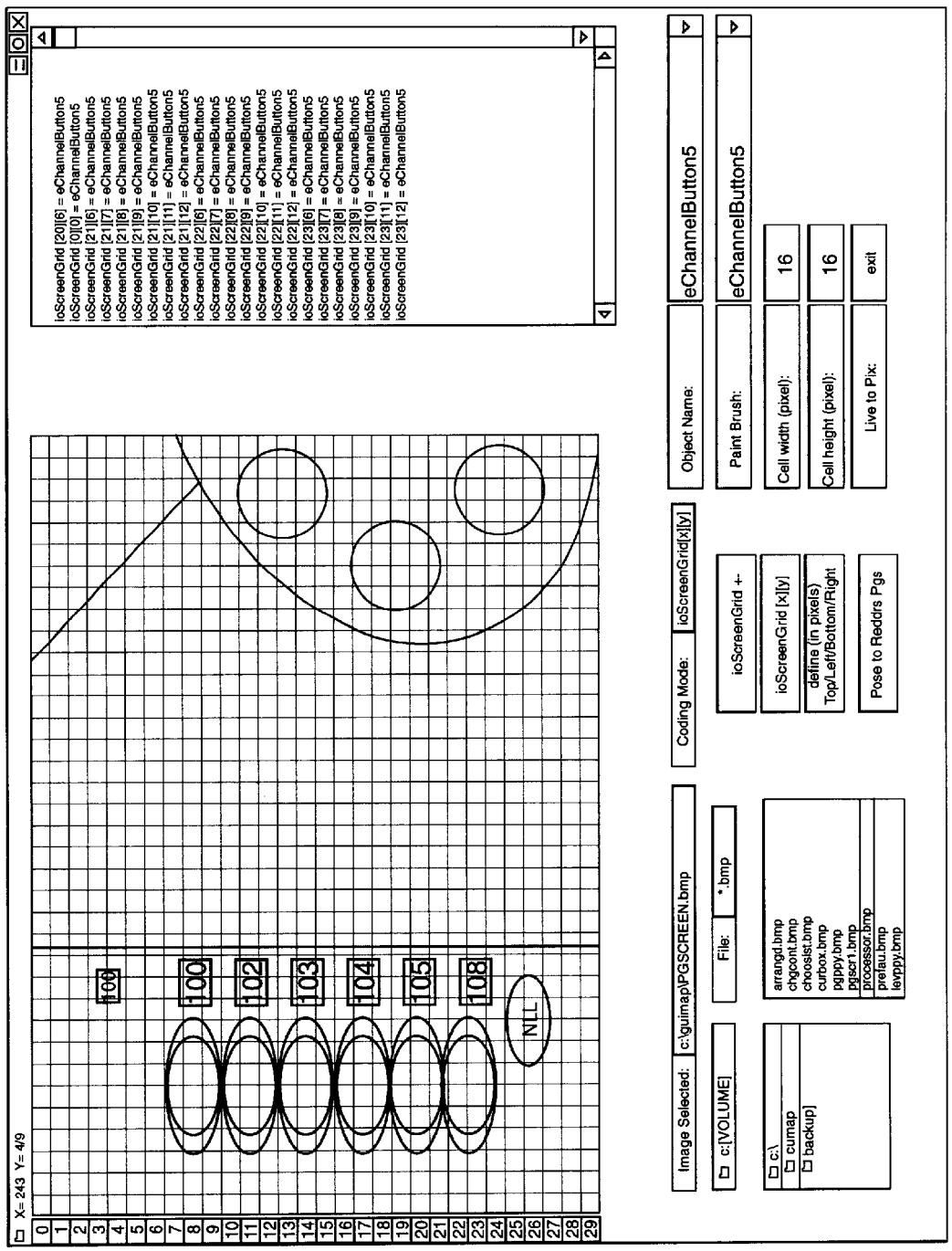
FIG. 7 is a representation of a display screen illustrating graphics data broken down into tiles.

The graphics data is arranged in frames, each of which corresponds to a complete picture on a TV screen to be displayed. Each frame is broken down into rectangular tiles of variable sizes, each of which may be composed, for example, of 8×16 picture elements (pixels) or 16×16 pixels. Each tile may represent a mixture of compressed and non-compressed graphics data. An example of a picture with graphics data broken down into tiles is shown in FIG. 7, wherein each TV channel logo is represented by several tiles.

Each tile is provided with a unique index number stored in an index table in the ROM 108. Each index number may be represented by a 2-byte word.

The DRAM 110 may be a synchronous DRAM that stores blocks of data during the MPEG decompression of received video and audio signals carried out by the MPEG decoder 104. However, by contrast with the conventional arrangement shown in FIG. 3, the CPU 102 does not supply the DRAM 110 with the graphics data from the system ROM 108 in order to provide graphics decompression. Instead, the CPU 102 supplies the DRAM 110 with an index table that contains index numbers identifying the tiles of graphics data stored in the system ROM 108. For example, each time graphics data corresponding to a new picture on a TV screen is to be displayed, the CPU 102 writes into the DRAM 110 an index table containing index numbers for the tiles of graphics data in a frame corresponding to the new picture. The CPU 102 communicates with the DRAM 110 via the MPEG decoder 104 using a path similar to the corresponding path in the conventional arrangement shown in FIG. 3.

As the storage capacity of the DRAM 110 does not restrict the amount of data representing each pixel of graphics, the arrangement of the present invention allows the number of bits per each pixel of graphics to be substantially increased to provide higher picture resolution and quality. For example, each pixel of graphics data may be represented by 8 bits.

In response to an instruction from the CPU 102 that points out which tile of graphics data is to be displayed, the MPEG decoder 104 searches the index table in the DRAM 110 to find the index number identifying the requested tile. Using this index number, the MPEG decoder 104 directly accesses the system ROM 108 to read the required tile of graphics data. If the graphics data in the tile is compressed, the MPEG decoder 104 decompresses the data in accordance with a conventional MPEG decompressing procedure. The decompressed graphics data is fed to the TV set 106 for displaying. If the graphics data in a tile retrieved from the system ROM 108 is not compressed, the MPEG decoder 106 passes the data to the TV set 106 without processing.

Figure 8:
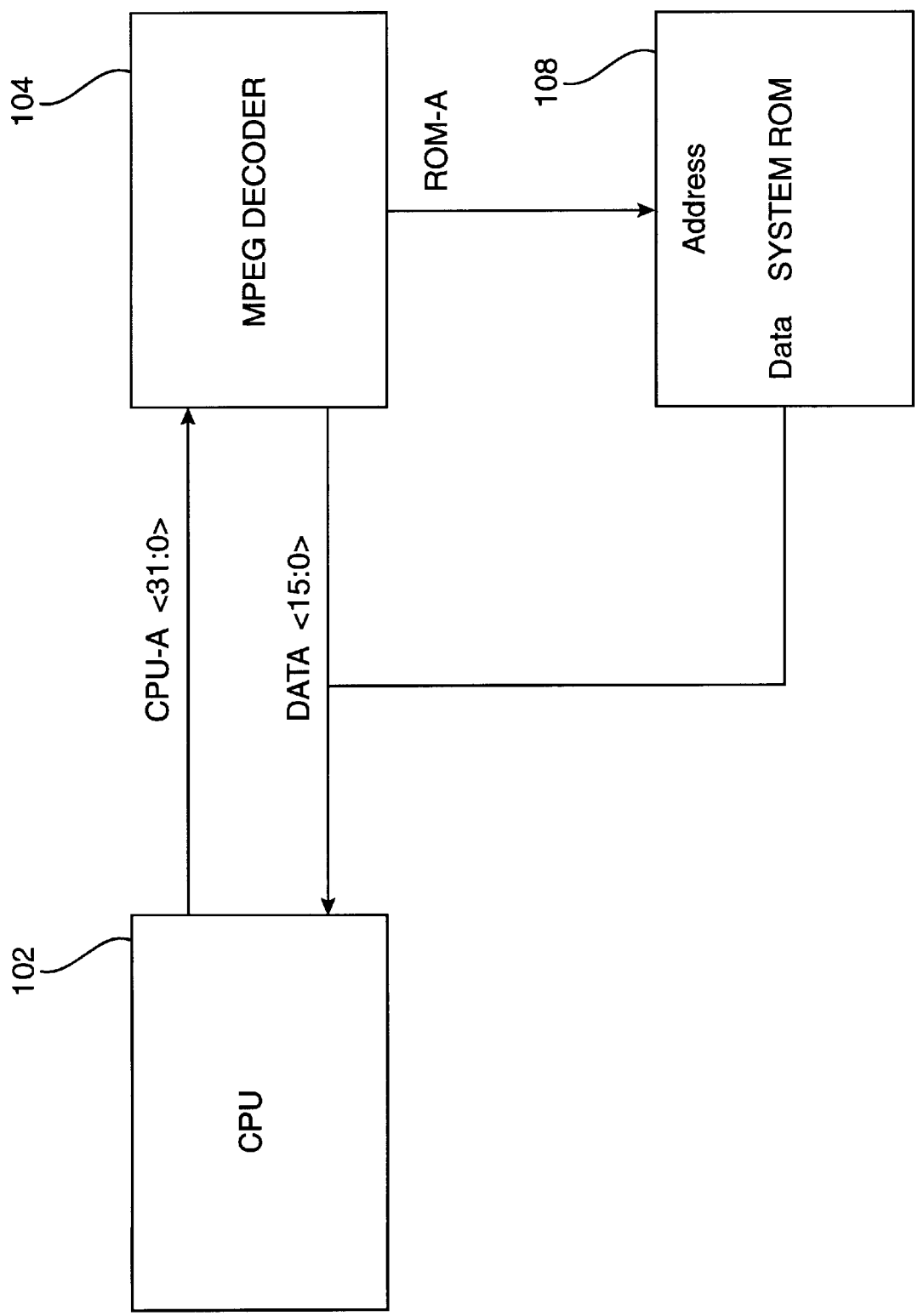
FIG. 8 is a block diagram illustrating interaction between a CPU and a system ROM in the graphics data decompression arrangement of the present invention.

Referring to FIG. 8, a bus arrangement for providing the MPEG decoder 104 with direct access to the system ROM 108 comprises a 32-bit address bus CPU-A coupled between the CPU 102 and the MPEG decoder 104, a 32-bit address bus ROM-A connected between the MPEG decoder 104 and the system ROM 108, and a 16-bit data bus DATA that connects data inputs of the CPU 102 and MPEG decoder 104 to the data output of the system ROM 108. As will be described in more detail later, the CPU-A bus is used by the CPU 102 to provide the MPEG decoder 104 with an address signal CPU-A that indicates where information required for CPU operations is located in the system ROM 108. The ROM-A bus is used to transmit address data from the CPU 102 and the MPEG decoder 104 to the system ROM 108 in successive time intervals. The DATA bus is shared by the CPU 102 and the MPEG decoder 104 to receive data in successive time intervals.

Figures 9, 10A, 10B, 10C:
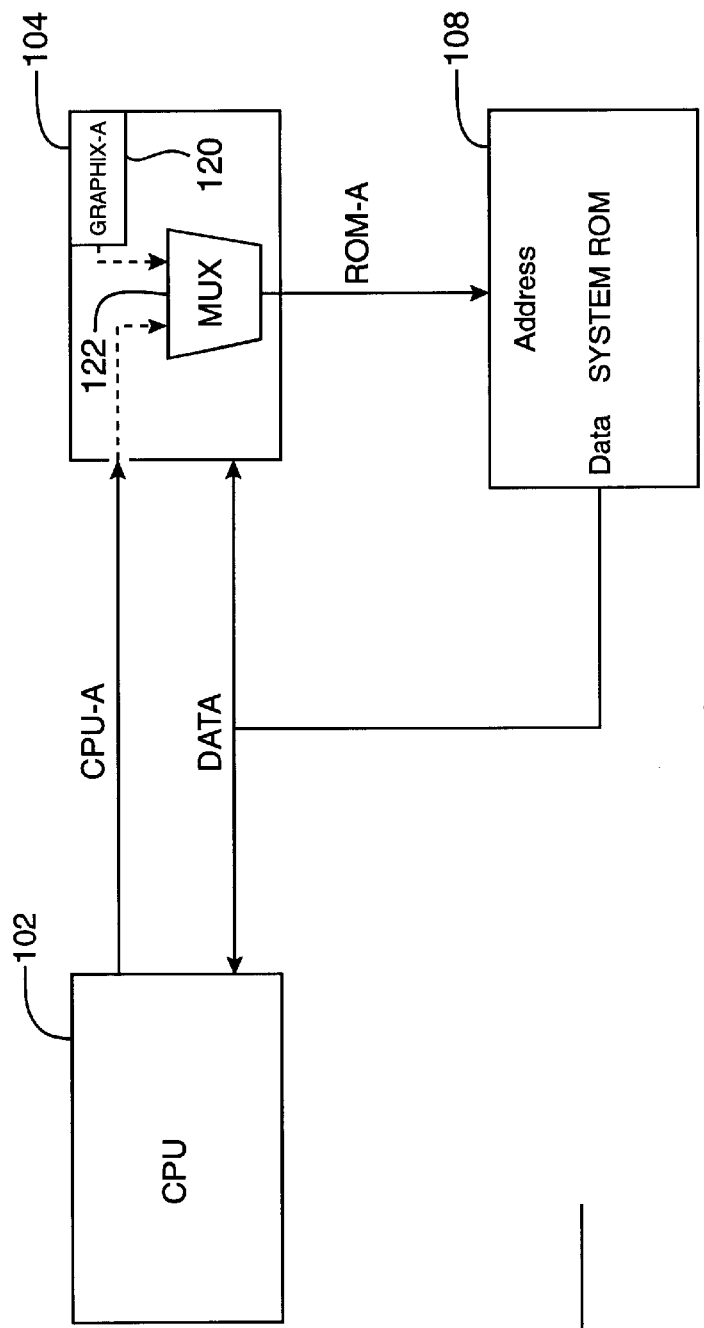
FIG. 9 is a block diagram illustrating address and data signals delivery in the graphics data decompression arrangement of the present invention.
FIGS. 10A, 10B and 10C are timing diagrams illustrating signals in system buses in the graphics data decompression arrangement of the present invention.

As shown in FIG. 9, the MPEG decoder 104 comprises a graphics address generator 120 hard-wired to convert index numbers that identify tiles of graphics data into addresses of the corresponding tiles in the system ROM 108. Using the index number read from the DRAM 110, the graphics address generator 120 generates an address signal GRAPHIX-A that indicates where the tile identified by the index number is located in the system ROM 108. The GRAPHIX-A signal is fed to one input of a multiplexer 122 having its another input supplied with the CPU-A address signal provided by the CPU 102 via the CPU-A bus. The CPU-A address signal indicates where information required for CPU operations is located in the system ROM 108. For example, the CPU-A address signal may identify CPU programming information.

The multiplexer 122 provides time-division multiplexing to transmit the GRAPHIX-A signal and the CPU-A signal via the ROM-A bus in successive time intervals. As illustrated in FIG. 10A, the CPU-A signal is supplied via the CPU-A bus during all three cycles $T_0 T_1$, and $T_2$ of the CPU processing period that define the system ROM access time. For the CPU 102 implemented by a CPU integrated circuit manufactured by Motorola, each of the cycles $T_0$–$T_2$ corresponds to a 16 MHz system clock cycle.

Referring to FIG. 10B, the GRAPHIX-A signal is fed from the output of the multiplexer 122 during the first half of the system ROM access time, whereas the CPU-A signal is supplied during the second half of the access time. Via the ROM-A bus, the GRAPHIX-A and CPU-A address signals are fed to the address input of the system ROM 108.

In response to the GRAPHIX-A address signal, the system ROM 108 supplies the DATA bus with a data signal GRAPHIX-DATA that conveys the graphics data identified by the selected index number to the MPEG decoder 104. The CPU-A address signal indicates the address of the information required for CPU operations, and causes a CPU-DATA signal, that conveys this information, to be sent to the CPU 102 via the DATA bus. FIG. 10C illustrates the time intervals during which the GRAPHIX-DATA and CPU-DATA signals are transmitted via the DATA bus.

There accordingly has been described a graphics data decompression arrangement in a TV set top box. Graphics data in a system ROM are broken down into tiles, each of which is identified by a unique index number. The index numbers that identify the tiles of graphics data required to be included in a current picture on a TV set screen are written into a DRAM. An MPEG decoder reads the index numbers to convert them into a graphics address signal supplied via a ROM address bus to the system ROM to indicate the addresses of the required tiles of graphics data. In response, the required tiles are fed to the MPEG decoder for decompression in accordance with an MPEG decompression algorithm. A time-division multiplexing scheme allows the ROM address bus to be used for transmitting to the system ROM an address signal from a CPU that indicates where information required for CPU operations is located in the system ROM. In response to the CPU address signal, the required information is fed to the CPU.

Thus, instead of graphics data, index numbers that identify the graphics data are written into the DRAM during graphics data decompression. As a result, the DRAM capacity necessary to decompress graphics data is considerably reduced. The savings of memory can be used to produce a higher quality graphics.

Further, as the CPU is required to handle graphics data processing only during a portion of processing period, it is able to perform other functions during the remaining portion of the processing period.

In this disclosure, there are shown and described only the preferred embodiments of the invention, but it is to be understood that the invention is capable of changes and modifications within the scope of the inventive concept as expressed herein.

We claim:

1. A system for decompressing graphics data, comprising:
   a central processing unit (CPU),
   a decoder controlled by said CPU for decompressing the graphics data, and
   a system ROM coupled to said decoder for storing the graphics data to be decompressed, and for supplying said decoder with the graphics data in response to a graphics address signal provided by said decoder to said system ROM.

2. The system of claim 1, wherein said system ROM stores the graphics data broken down into tiles having unique index numbers.

3. The system of claim 2, further comprising a RAM for storing said index numbers.

4. The system of claim 3, wherein said index numbers are supplied from said RAM to said decoder for generating said graphics address signal.

5. The system of claim 4, wherein said system ROM further stores information required for operations of said CPU.

6. The system of claim 5, wherein said CPU provides a CPU address signal to indicate address of said information in said system ROM.

7. The system of claim 6, wherein said CPU address signal is fed to said decoder.

8. The system of claim 7, further comprising a ROM address bus connected between said decoder and said system ROM.

9. The system of claim 8, wherein said CPU address signal and said graphics address signal are transmitted via said ROM address bus to said system ROM.

10. The system of claim 9, wherein said decoder comprises a graphics address generator preprogrammed to convert said index numbers into said graphics address signal to indicate locations of the tiles identified by said index numbers in said system ROM.

11. The system of claim 10, wherein said decoder further comprises a time-division multiplexer for transmitting said graphics address signal and said CPU address signal in successive time intervals.

12. The system of claim 11, further comprising a data bus connected between a data output of said system ROM and data inputs of said CPU and decoder.

13. The system of claim 12, wherein said graphics data and said information required for CPU operations are supplied from said system ROM via said data bus in successive time intervals.

14. The system of claim 13, wherein said decoder comprises an MPEG decoder for performing graphics data decompression in accordance with an MPEG decompression algorithm.

15. The system of claim 14, wherein each of said tiles defines a mixture of compressed and non-compressed graphics data.

16. A television system comprising:
    a transmitter for generating a stream of digital packets representing video and audio signals compressed in accordance with a compression algorithm, and
    a receiver for receiving said stream of digital packets, decompressing said video and audio signals in accordance with a decompression algorithm, and supplying said decompressed signals to a TV set,
    said receiver including:
        a CPU,
        a system ROM for storing graphics data to be displayed by said TV set, and
        an MPEG decoder controlled by said CPU for decompressing said graphics data, together with said video and audio signals, said MPEG decoder supplying said system ROM with a graphics address signal to receive said graphics data directly from said system ROM.

17. The system of claim 16, wherein said receiver further comprises a RAM coupled to said MPEG decoder for storing said video and audio signals during an MPEG decompression procedure.

18. The system of claim 17, wherein said system ROM stores said graphics data broken down into data blocks having identification numbers, and said RAM stores said identification numbers.

19. The system of claim 18, wherein said identification numbers are supplied from said RAM to said MPEG decoder to enable said MPEG decoder to receive said graphics data from said system ROM.

20. A method of graphics data decompression comprising the steps of:
    storing graphics data in a ROM,
    dividing said graphics data into data blocks identified by index numbers,
    storing said index numbers in a RAM,
    reading said index numbers from said RAM to generate an address signal for accessing said ROM,
    retrieving said graphics data from said ROM in response to said address signal, and
    decompressing said graphics data.

* * * * *